United States Patent
Lim et al.

(10) Patent No.: US 8,599,902 B2
(45) Date of Patent: *Dec. 3, 2013

(54) FREQUENCY SELECTIVE MODULATING APPARATUS AND METHOD USING RE-SPREADING CODE

(75) Inventors: In Gi Lim, Daejeon (KR); Hyung Il Park, Daejeon (KR); Sung Weon Kang, Daejeon (KR); Tae Wook Kang, Daejeon (KR); Chang Hee Hyoung, Daejeon (KR); Jung Hwan Hwang, Daejeon (KR); Kyung Soo Kim, Daejeon (KR); Jung Bum Kim, Daejeon (KR); Sung Eun Kim, Seoul (KR); Jin Kyung Kim, Daejeon (KR); Seok Bong Hyun, Daejeon (KR); Kyung Hwan Park, Daejeon (KR); Byoung Gun Choi, Daegu (KR); Tae Young Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 623 days.

This patent is subject to a terminal disclaimer.

(21) Appl. No.: 12/853,499

(22) Filed: Aug. 10, 2010

(65) Prior Publication Data

US 2011/0058591 A1    Mar. 10, 2011

(30) Foreign Application Priority Data

Sep. 7, 2009  (KR) .......................... 10-2009-0084206
Feb. 18, 2010  (KR) .......................... 10-2010-0014837

(51) Int. Cl.
*H04B 1/00* (2006.01)

(52) U.S. Cl.
USPC ............................ 375/146; 375/130; 375/140

(58) Field of Classification Search
USPC .................. 375/146, 130, 140, 260; 332/117; 329/315

See application file for complete search history.

(56) References Cited

U.S. PATENT DOCUMENTS

| | | | | |
|---|---|---|---|---|
| 5,625,639 | A | * | 4/1997 | Tomita et al. ................. 375/146 |
| 2010/0074257 | A1 | | 3/2010 | Lim |
| 2010/0171562 | A1 | * | 7/2010 | Lim et al. ...................... 332/117 |

FOREIGN PATENT DOCUMENTS

WO    WO 2009/002009 A1    12/2008

OTHER PUBLICATIONS

T. G. Zimmerman, "Personal Area Networks: Near-Field intrabody communication", IBM Systems Journal, 1996, pp. 609-617, vol. 35, Nos. 3&4, IBM.

* cited by examiner

*Primary Examiner* — Shuwang Liu
*Assistant Examiner* — Helene Tayong (57) ABSTRACT

A frequency selective modulation apparatus and method using re-spreading codes are disclosed. The frequency selective modulation apparatus includes: a serial-to-parallel converter receiving transmission data and performing serial-to-parallel conversion on the transmission data at a pre-set ratio; one or more sub-frequency selective spreaders selecting one spreading code by using data bits received from the serial-to-parallel converter; a majority value selection unit selecting a majority value from one or more spreading codes which have been selected by each of the one or more of the sub-frequency selective spreaders; and a first XOR logic circuit XORing an output of the majority value selection unit and a re-spreading code $W_n$ to re-spread a frequency selective baseband to a frequency selective passband.

19 Claims, 9 Drawing Sheets

FIG. 1

0th sub-group ($W_0 \sim W_{15}$)

| W0  | 0000000000000000000000000000000000000000000000000000000000000000 |
|-----|------------------------------------------------------------------|
| W1  | 0000000000000000000000000000000011111111111111111111111111111111 |
| W2  | 0000000000000000111111111111111111111111111111110000000000000000 |
| W3  | 0000000000000000111111111111111100000000000000001111111111111111 |
| W4  | 0000000011111111111111110000000000000000111111111111111100000000 |
| W5  | 0000000011111111111111110000000011111111000000000000000011111111 |
| W6  | 0000000011111111000000001111111111111111000000001111111100000000 |
| W7  | 0000000011111111000000001111111100000000111111110000000011111111 |
| W8  | 0000111111110000000011111111000000001111111100000000111111110000 |
| W9  | 0000111111110000000011111111000011110000000011111111000000001111 |
| W10 | 0000111111110000111100000000111111110000000011110000111111110000 |
| W11 | 0000111111110000111100000000111100001111111100001111000000001111 |
| W12 | 0000111100001111111100001111000000001110000111111110000111110000 |
| W13 | 0000111100001111111100001111000011110000111100000000111100001111 |
| W14 | 0000111100001111000011110000111111110000111100001111000011110000 |
| W15 | 0000111100001111000011110000111100001111000011110000111100001111 |

FIG. 2A

First sub-group ($W_{16} \sim W_{31}$)

| W16 | 0011110000111100001111000011110000111100001111000011110000111100 |
|-----|------------------------------------------------------------------|
| W17 | 0011110000111100001111000011110011000011110000111100001111000011 |
| W18 | 0011110000111100110000111100001111000011110000110011110000111100 |
| W19 | 0011110000111100110000111100001100111100001111001100001111000011 |
| W20 | 0011110011000011110000110011110000111100110000111100001100111100 |
| W21 | 0011110011000011110000110011110011000011001111000011110011000011 |
| W22 | 0011110011000011001111001100001111000011001111001100001100111100 |
| W23 | 0011110011000011001111001100001100111100110000110011110011000011 |
| W24 | 0011001111001100001100111100110000110011110011000011001111001100 |
| W25 | 0011001111001100001100111100110011000011001111001100001100110011 |
| W26 | 0011001111001100110011000011001111001100001100110011001111001100 |
| W27 | 0011001111001100110011000011001100110011110011001100110000110011 |
| W28 | 0011001100110011110011001100110000110011001100111100110011001100 |
| W29 | 0011001100110011110011001100110011001100110011000011001100110011 |
| W30 | 0011001100110011001100110011001111001100110011001100110011001100 |
| W31 | 0011001100110011001100110011001100110011001100110011001100110011 |

FIG. 2B

Second sub-group (W32~W47)

| W32 | 0110011001100110011001100110011001100110011001100110011001100110 |
|---|---|
| W33 | 0110011001100110011001100110011010011001100110011001100110011001 |
| W34 | 0110011001100110100110011001100110011001100110010110011001100110 |
| W35 | 0110011001100110100110011001100110101100110011001010011001100110011001 |
| W36 | 0110011010011001100110010110011001100110100110011001100110011001100110 |
| W37 | 0110011010011001100110010110011010011001011001100110011010011001 |
| W38 | 0110011010011001011001101001100110011001011001101001100101100110 |
| W39 | 0110011010011001011001101001100101100110100110010110011010011001 |
| W40 | 0110100110010110011010011001011001101001100101100110100110010110 |
| W41 | 0110100110010110011010011001011010010110011010011001011001101001 |
| W42 | 0110100110010110100101100110100110010110011010010110100110010110 |
| W43 | 0110100110010110100101100110100101101001100101101001011001101001 |
| W44 | 0110100101101001100101101001011001101001011010011001011010010110 |
| W45 | 0110100101101001100101101001011010010110100101100110100101101001 |
| W46 | 0110100101101001011010010110100110010110100101101001011010010110 |
| W47 | 0110100101101001011010010110100101101001011010010110100101101001 |

FIG. 2C

Third sub-group (W48~W63)

| W48 | 0101101001011010010110100101101001011010010110100101101001011010 |
|---|---|
| W49 | 0101101001011010010110100101101010010110100101101001011010100101 |
| W50 | 0101101001011010101001011010010110100101101001010101101001011010 |
| W51 | 0101101001011010101001011010010101011010010110101001010110100101 |
| W52 | 0101101010100101101001010101101001011010101001010110100101011010 |
| W53 | 0101101010100101101001010101101010010101011010010101011010100101 |
| W54 | 0101101010100101010110101010010110100101010110101010010101011010 |
| W55 | 0101101010100101010110101010010101011010101001010101101010100101 |
| W56 | 0101010110101010010101011010101001010101101010100101010110101010 |
| W57 | 0101010110101010010101011010101010100101010101101010101001010101 |
| W58 | 0101010110101010101010010101011010101001010101010101010110101010 |
| W59 | 0101010110101010101010010101010101010110101010101010101001010101 |
| W60 | 0101010101010110101010101010100101010101010101101010101010101010 |
| W61 | 0101010101010110101010101010101010101010101010010101010101010101 |
| W62 | 0101010101010101010101010101010110101010101010101010101010101010 |
| W63 | 0101010101010101010101010101010101010101010101010101010101010101 |

FREQUENCY SELECTIVE MODULATING APPARATUS AND METHOD USING RE-SPREADING CODE

CROSS-REFERENCE TO RELATED APPLICATIONS

This application claims the priorities of Korean Patent Application Nos. 10-2009-0084206 filed on Sep. 7, 2009, and 10-2010-0014837 filed on Feb. 18, 2010, in the Korean Intellectual Property Office, the disclosures of which are incorporated herein by reference.

BACKGROUND OF THE INVENTION

1. Field of the Invention

The present invention relates to a frequency selective modulating apparatus and method using a re-spreading code and, more particularly, to a technique that uses a limited frequency band in which the strength of a signal transmitted by using a human body as a waveguide is greater than that of a signal radiated to the outside of the human body, avoiding a frequency band in which noise power around the human body is concentrated compared with other ranges, and allows for the free shifting of a transmission frequency band through re-spreading of a frequency selective baseband.

2. Description of the Related Art

Korean Patent No. 912543 entitled "Modulation and Demodulation Method and Apparatus using Frequency Selective Baseband" which was filed in 2007 and registered in 2009 by the inventor of the present invention discloses a technique that uses a limited frequency band to implement a human body communication system and transmits data at a frequency selective baseband by using multi-structured frequency selective spreading codes in order to transmit a larger amount of data through the limited frequency band.

However, the preceding patent in which data is transmitted only at a frequency selective baseband within a limited frequency band is disadvantageous in that the selective use of spreading codes degrades efficiency, and the free shifting of a transmission frequency band is not possible.

SUMMARY OF THE INVENTION

An aspect of the present invention provides a frequency selective modulation apparatus and method using re-spreading codes that allow for the free shifting of a transmission frequency band by re-spreading a frequency selective baseband using re-spreading codes.

According to an aspect of the present invention, there is provided a frequency selective modulation apparatus using re-spreading codes, including: a serial-to-parallel converter receiving transmission data and performing serial-to-parallel conversion on the transmission data at a pre-set ratio; one or more sub-frequency selective spreaders selecting one spreading code by using data bits received from the serial-to-parallel converter; a majority value selection unit selecting a majority value from one or more spreading codes which have been selected by each of the one or more of the sub-frequency selective spreaders; and a first XOR logic circuit XORing an output from the majority value selection unit and a re-spreading code Wn to re-spread a frequency selective baseband to a frequency selective passband.

According to another aspect of the present invention, there is provided a frequency selective modulation method using re-spreading codes, including: generating a plurality of sub-groups by dividing $2^N$ (N is a real number) number of spreading codes by $2^M$ (M is a real number and M<N); receiving serial-to-parallel converted data bits, and selecting one spreading code from each of P (P is a real number of 1 or larger) number of sub-groups selected from among the plurality of generated sub-groups, by using the received serial-to-parallel converted data bits; selecting a majority value from P number of spreading codes which have been selected from the P number of sub-groups; and XORing the selected majority value and a re-spreading code Wn to re-spread a frequency selective baseband to a frequency selective passband.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert from the gist of the present invention, such explanation will be omitted but would be understood by those skilled in the art. In the drawings, the shapes and dimensions may be exaggerated for clarity, and the same reference numerals will be used throughout to designate the same or like components.

It will be understood that when an element is referred to as being "connected with" another element, it can be directly connected with the other element or intervening elements may also be present. In contrast, when an element is referred to as being "directly connected with" another element, there are no intervening elements present. In addition, unless explicitly described to the contrary, the word "comprise" and variations such as "comprises" or "comprising," will be understood to imply the inclusion of stated elements but not the exclusion of any other elements.

A modulation apparatus proposed by the present invention uses a frequency selective digital transmission (FSDT) scheme. In the FSDT scheme, data is spread at a frequency domain by using a frequency selective spreading code and transmitted in a digital form. Also, the modulation apparatus proposed by the present invention features that a dominant frequency in which most transmission signals are distributed is selected by using a particular frequency selective spreading code.

Figure 1:
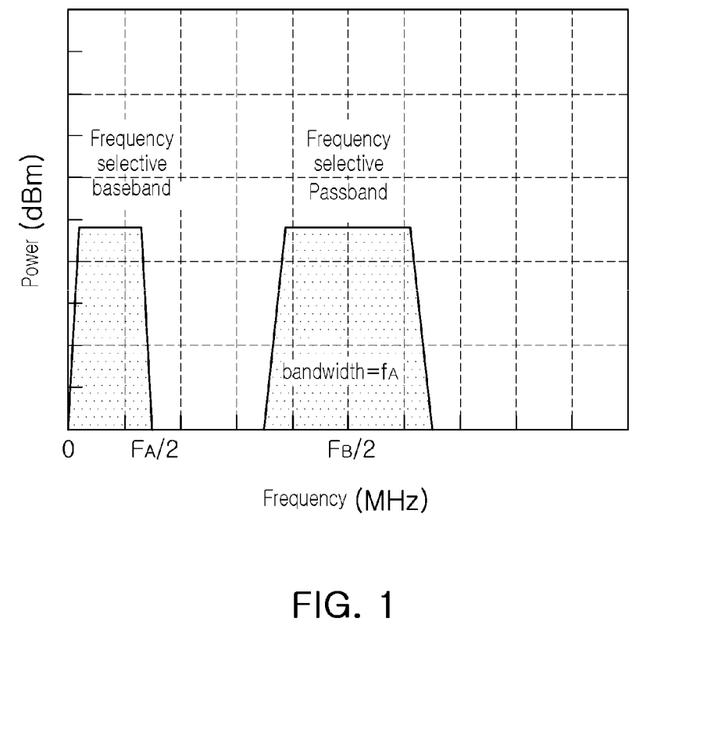
FIG. 1 is a graph for explaining the concept of re-spreading a frequency selective baseband to a frequency selective passband according to an exemplary embodiment of the present invention.
Figure 2A:
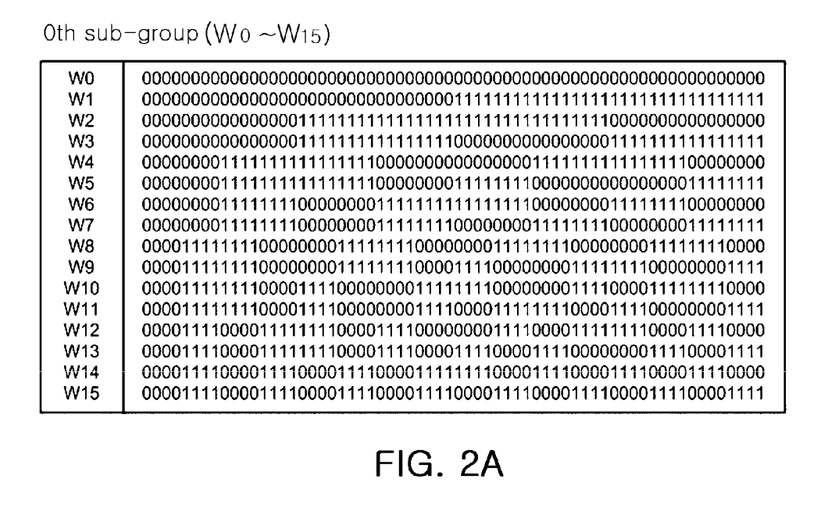
FIGS. 2A to 2D show the configuration of sub-groups of 64-bit Walsh codes according to an exemplary embodiment of the present invention.
Figure 2B:
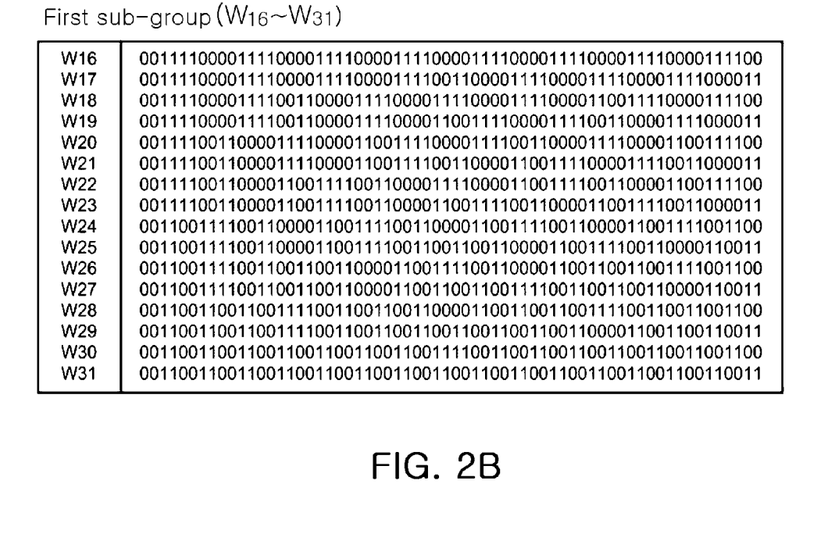
Figure 2C:
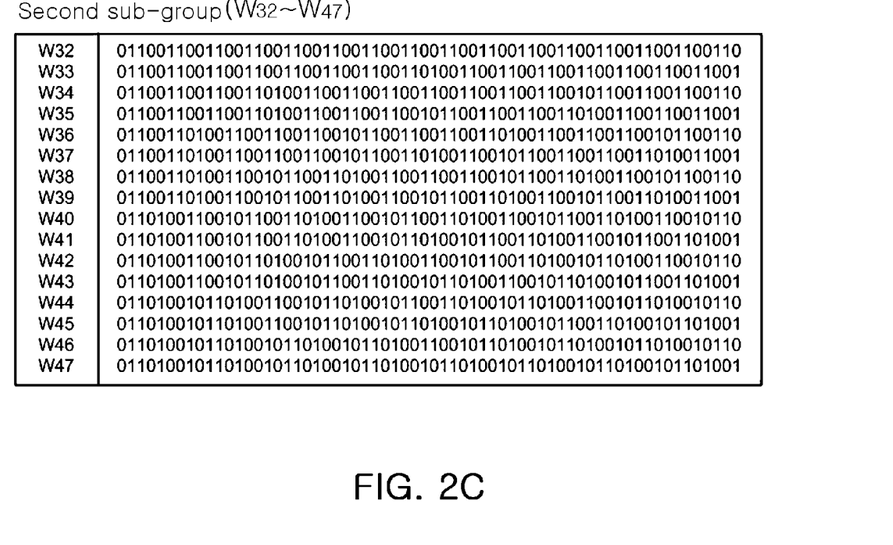
Figure 2D:
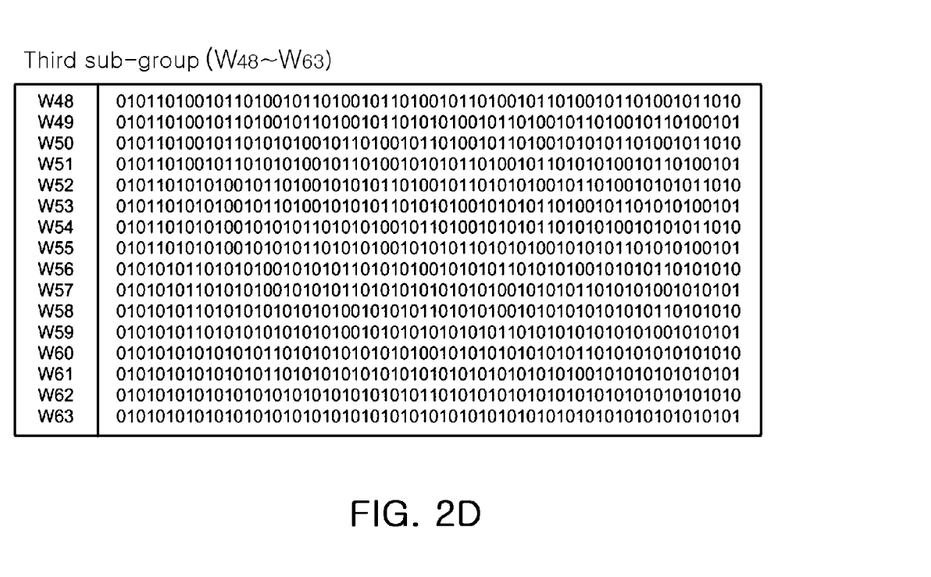

FIG. 1 is a graph for explaining the concept of re-spreading a frequency selective baseband to a frequency selective passband according to an exemplary embodiment of the present invention.

In an exemplary embodiment of the present invention, a frequency selective baseband proposed in the preceding patent is re-spread through a re-spreading code so as to be shifted to a frequency selective passband. Thus, in order to shift the frequency selective baseband using an operating frequency $f_A$ to the frequency selective passband by re-spreading it, re-spreading is performed by using one of spreading codes generated with an operating frequency $f_B$. The frequency selective passband has an intermediate frequency $f_C$ and a bandwidth $f_A$, and in this case, the intermediate frequency $f_C$ has the most dominant frequency ($f_D$) value of a single spreading code selected from among the spreading codes generated with the operating frequency $f_B(f_B > f_A)$.

FIGS. 2A to 2D show the configuration of sub-groups of 64-bit Walsh codes according to an exemplary embodiment of the present invention.

In the present exemplary embodiment, 64 Walsh codes are used as spreading codes. The 64 Walsh codes are grouped by intervals of every sixteen Walsh codes into four sub-groups. In this case, $0^{th}$ sub-group includes sixteen Walsh codes $W_0 \sim W_{15}$, a first sub-group includes sixteen Walsh codes $W_{16} \sim W_{31}$, a second sub-group includes sixteen Walsh codes $W_{32} \sim W_{47}$, and a third sub-group includes sixteen Walsh codes $W_{48} \sim W_{63}$.

The 64 Walsh codes from $W_0$ to $W_{63}$ have characteristics such that a used frequency band is precisely divided into 64 segments, and the most dominant frequency ($f_D$) of each Walsh code is sequentially mapped to the segmented frequency.

For example, a spread frequency band of the entire Walsh codes generated by using the operating frequency $f_A$ as 16 MHz is 8 MHz ($f_A/2$), and interval of the most dominant frequency ($f_D$) of neighboring Walsh codes is 0.125 MHz (8 MHz/64). Accordingly, the dominant frequency $f_D$ of W63 illustrated in FIG. 2D has 8 MHz, the dominant frequency $f_D$ of W62 illustrated in FIG. 2D has 7.875 MHz, . . . etc.

A frequency selective modulation apparatus and method according to exemplary embodiments of the present invention will now be described with reference to FIGS. 3 to 7.

In the following description, it is assumed that 64 Walsh codes are used as spreading codes, the 64 Walsh codes are divided into four sub-groups as illustrated in FIGS. 2A to 2D, and the sub-groups, excluding the $0^{th}$ sub-group or the $0^{th}$ and first sub-groups which correspond to frequency in which noise power is strong, are selected to be used (namely, 48 or 32 Walsh codes among the entire 64 Walsh codes are selectively used). It is also assumed that the operating frequency $f_A$ of a spreading code is 16 MHz, the operating frequency $f_B$ of a re-spreading code is 64 MHz, and W63 is used as a re-spreading code.

However, the used spreading codes and the number of sub-groups are not limited thereto, and a total of $2^N$ (N is a real number) number of spreading codes may be divided by $2^M$ (M is a real number and M<N) to generate sub-groups, of which P (P is a real number of 1 or greater) number of sub-groups may be selectively used. Also, the operating frequency $f_A$ of a spreading code, the operating frequency $f_B$ of a re-spreading code, and the re-spreading code may be determined to be different as necessary.

Figure 3:
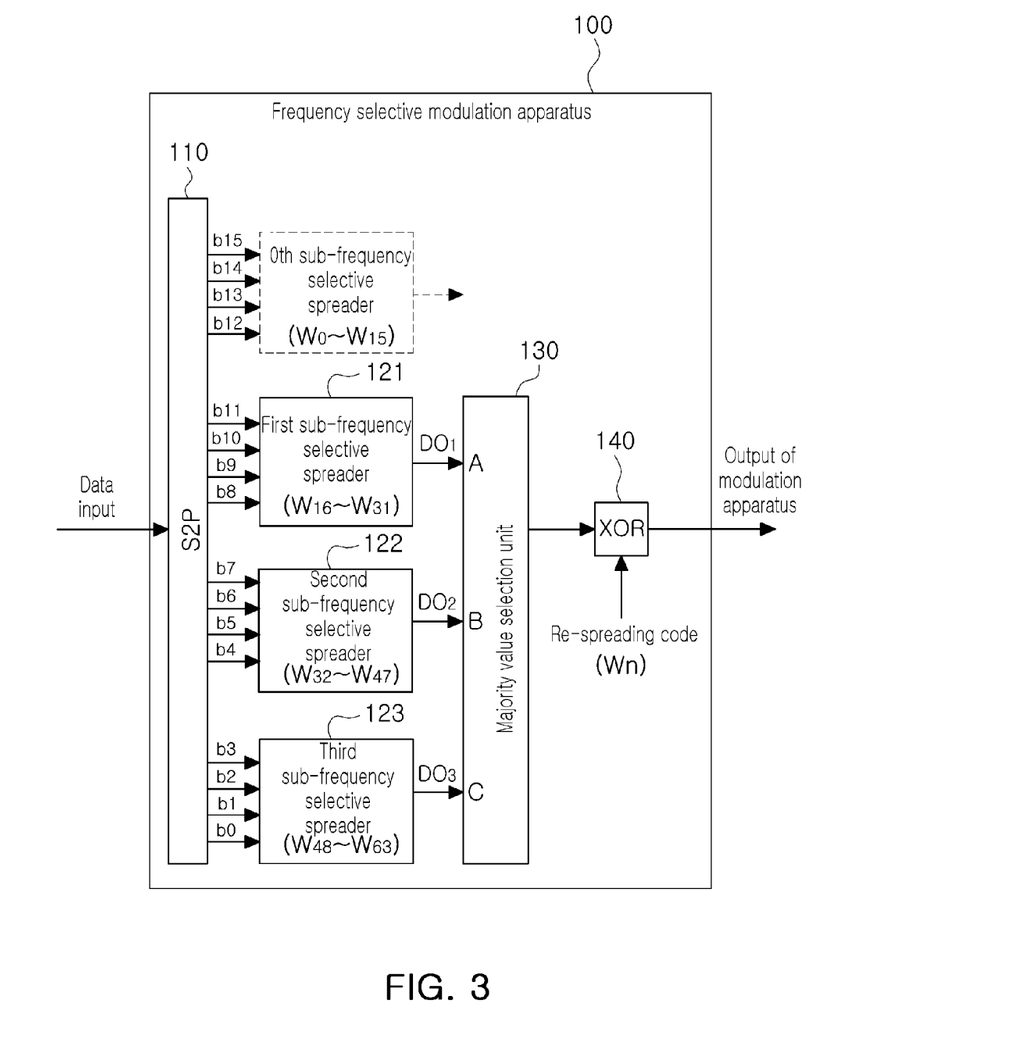
FIG. 3 illustrates the configuration of a frequency selective modulation apparatus according to a first exemplary embodiment of the present invention.

FIG. 3 illustrates the configuration of a frequency selective modulation apparatus according to a first exemplary embodiment of the present invention.

A frequency selective modulation apparatus 100 according to the first exemplary embodiment of the present invention includes a serial-to-parallel converter S2P 110 receiving transmission data and performing a serial-to-parallel conversion on the received transmission data at a pre-set ratio, one or more sub-frequency selective spreaders 121 to 123 selecting one spreading code by using data bits which have been received from the serial-to-parallel converter S2P 110, a majority value selection unit 130 selecting a majority value from one or more spreading codes acquired through the one or more sub-frequency selective spreaders 121 to 123, and an XOR logic circuit 140 XORing an output from the majority value selection unit 130 and a re-spreading code Wn to re-spread a frequency selective baseband to a frequency selective passband.

The serial-to-parallel converter S2P 110 converts input serial data into parallel data of P*M bits and outputs the same.

Thereafter, the one or more (e.g., P number of) sub-frequency selective spreaders 121 to 123 receive M number of data bits, respectively, and select one of $2^M$ number of spreading codes from corresponding sub-groups by using the received M number of data bits. Namely, P number of spreading codes are selected through the P number of sub-frequency selective spreaders 121 to 123.

Thereafter, the majority value selection unit 130 selects a majority value from the P number of spreading codes which have been acquired through the P number of sub-frequency selective spreaders 121 to 123 to generate transmission data including the majority value.

Thereafter, the XOR logic circuit 140 XORs the output from the majority value selection unit 130 and the re-spreading code Wn to re-spread the frequency selective baseband to the frequency selective passband. In this case, the re-spreading code Wn is selected from among the spreading codes which have been generated with the operating frequency $f_B$.

The foregoing process will now be described in more detail by using a substantial example.

The serial-to-parallel converter S2P 110 performs a serial-to-parallel conversion on the input serial data at a ratio of 1:12 and outputs 12-bit parallel data of b11, b10, . . . , b0 at a speed of 0.25 Msps.

The first sub-frequency selective spreader 121 receives 4 bits of b11, b10, b9, and b8 among the output from the serial-to-parallel converter S2P 110, selects one of the Walsh codes of the first sub-group $W_{16} \sim W_{31}$ by using the four bits, and outputs $D0_1$ at a speed of 16 Mcps.

The second sub-frequency selective spreader 122 receives 4 bits of b7, b6, b5, and b4 among the output from the serial-to-parallel converter S2P 110, selects one of the Walsh codes of the second sub-group $W_{32} \sim W_{47}$ by using the four bits, and outputs $D0_2$ at a speed of 16 Mcps.

The third sub-frequency selective spreader 123 receives 4 bits of b3, b2, b1, and b0 among the output from the serial-to-parallel converter S2P 110, selects one of the Walsh codes of the third sub-group $W_{43} \sim W_{63}$ by using the four bits, and outputs $D0_3$ at a speed of 16 Mcps.

The majority value selection unit 130 receives $D0_1$, $D0_2$, and $D0_3$ output from the first to third sub-frequency selective spreaders 121 to 123, selects a majority value according to Equation 1 shown below, and outputs the same. Here, 'or' indicates an OR gate and 'and' indicates an AND gate.

Output of majority value selection unit=(A and B) or
(B and C) or (C and A)   [Equation 1]

The XOR logic circuit 140 XORs an output from the majority value selection unit 130 and the re-spreading code $W_{63}$, one of the 64 Walsh codes generated with the operating frequency $f_B$ 64 MHz, to generate a final output of the frequency selective modulation apparatus 100 having a speed of 64 Mcps. In this case, the output from the majority value selection unit 130 is XORed with the Walsh code W63, performing 4-fold additional spreading, so the frequency selective passband corresponding to the final output of the frequency selective modulation apparatus 100 has 32 MHz, i.e., a half of the operating frequency $f_B$ of the re-spreading code, as the intermediate frequency $f_C$, and 16 MHz, i.e., the operating frequency value $f_A$ of the spreading code, as a maximum bandwidth.

Figure 4:
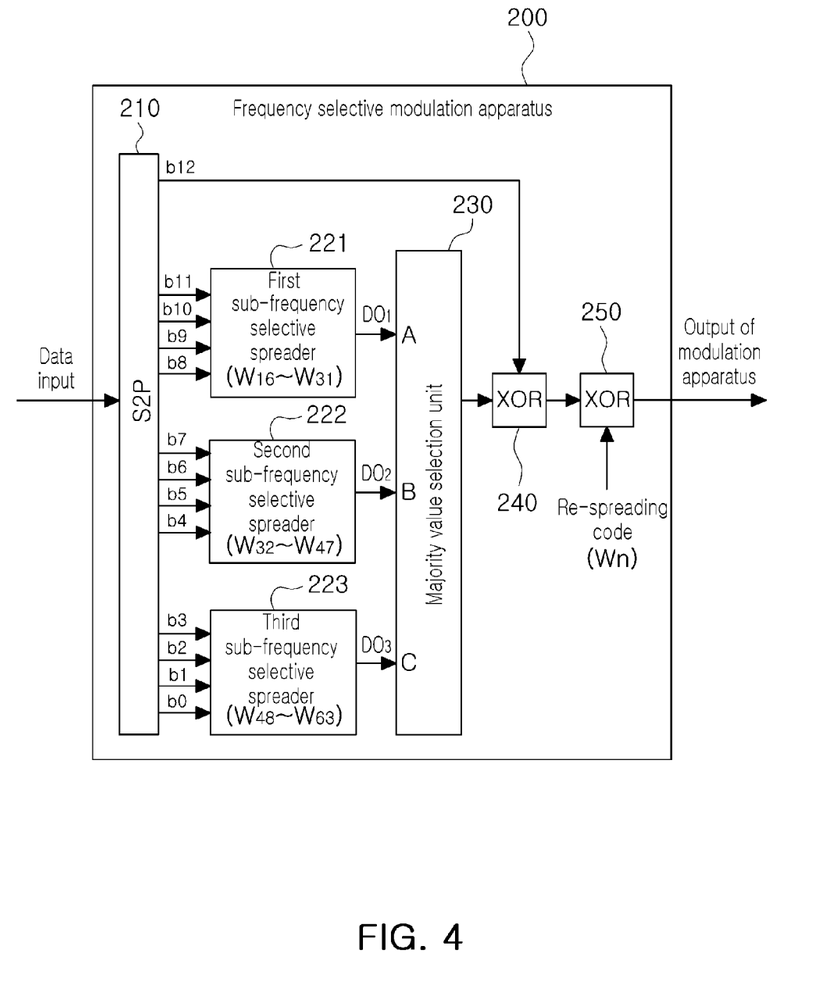
FIG. 4 illustrates the configuration of a frequency selective modulation apparatus according to a second exemplary embodiment of the present invention.

FIG. 4 illustrates the configuration of a frequency selective modulation apparatus according to a second exemplary embodiment of the present invention.

The frequency selective modulation apparatus 200 according to the second exemplary embodiment of the present invention includes a serial-to-parallel converter S2P 210, one or more sub-frequency selective spreaders 221 to 223, a majority value selection unit 230, and two XOR logic circuits 240 and 250. Here, the serial-to-parallel converter S2P 210, the one or more sub-frequency selective spreaders 221 to 223, the majority value selection unit 230, and the XOR logic circuit 250 correspond to the respective elements of the frequency selective modulation apparatus 100 according to the first exemplary embodiment of the present invention. Compared with the frequency selective modulation apparatus 100 according to the first exemplary embodiment of the present invention, the frequency selective modulation apparatus 200 according to the second exemplary embodiment of the present invention additionally includes an XOR logic circuit 240 positioned between the majority value selection unit 230 and the XOR logic circuit 250 for performing re-spreading, and XORing 1 bit, among the output from the serial-to-parallel converter S2P 210, and an output from the majority value selection unit 230 to increase a transmission data rate.

Unlike the first exemplary embodiment of the present invention, the serial-to-parallel converter S2P 210 converts input serial data into parallel data of P*M+1 bits and outputs the same. The XOR logic circuit 240 XORs 1 bit, among the output from the serial-to-parallel converter S2P 210, and the output from the majority value selection unit 230. The XOR logic circuit 250 for performing re-spreading XORs an output from the XOR logic circuit 240 and the re-spreading code Wn to generate an output of the modulation apparatus. The other elements are configured in the same manner as those described above in the first exemplary embodiment of the present invention.

The foregoing process will now be described in detail by using a substantial example.

The serial-to-parallel converter S2P 210 performs a serial-to-parallel conversion on the input serial data at a ratio of 1:13 and outputs 13-bit parallel data of b12, b11, . . . , b0 at a speed of 0.25 Msps.

A first sub-frequency selective spreader 221 receives 4 bits of b11, b10, b9, and b8 among the output from the serial-to-parallel converter S2P 210, selects one of the Walsh codes of the first sub-group $W_{16} \sim W_{31}$ by using the four bits, and outputs $D0_1$ at a speed of 16 Mcps.

A second sub-frequency selective spreader 222 receives 4 bits of b7, b6, b5, and b4 among the output from the serial-to-parallel converter S2P 210, selects one of the Walsh codes of the second sub-group $W_{32} \sim W_{47}$ by using the four bits, and outputs $D0_2$ at the speed of 16 Mcps.

A third sub-frequency selective spreader 223 receives 4 bits of b3, b2, b1, and b0 among the output from the serial-to-parallel converter S2P 210, selects one of the Walsh codes of the third sub-group $W_{48} \sim W_{63}$ by using the four bits, and outputs $D0_3$ at the speed of 16 Mcps.

The majority value selection unit 230 receives $D0_1$, $D0_2$, and $D0_3$ output from the first to third sub-frequency selective spreaders 221 to 223, selects a majority value according to Equation 1, and outputs the same.

The XOR logic circuit 240 XORs b12, 1 bit, among the output from the serial-to-parallel converter S2P 210, and the output from the majority value selection unit 230 and provides the same to the XOR logic circuit 250 for re-spreading.

The XOR logic circuit 250 XORs an output from the XOR logic circuit 240 and a re-spreading code W63, one of the 64 Walsh codes generated with an operating frequency, to generate a final output of the frequency selective modulation apparatus 200 having a speed of 64 Mcps.

Figure 5:
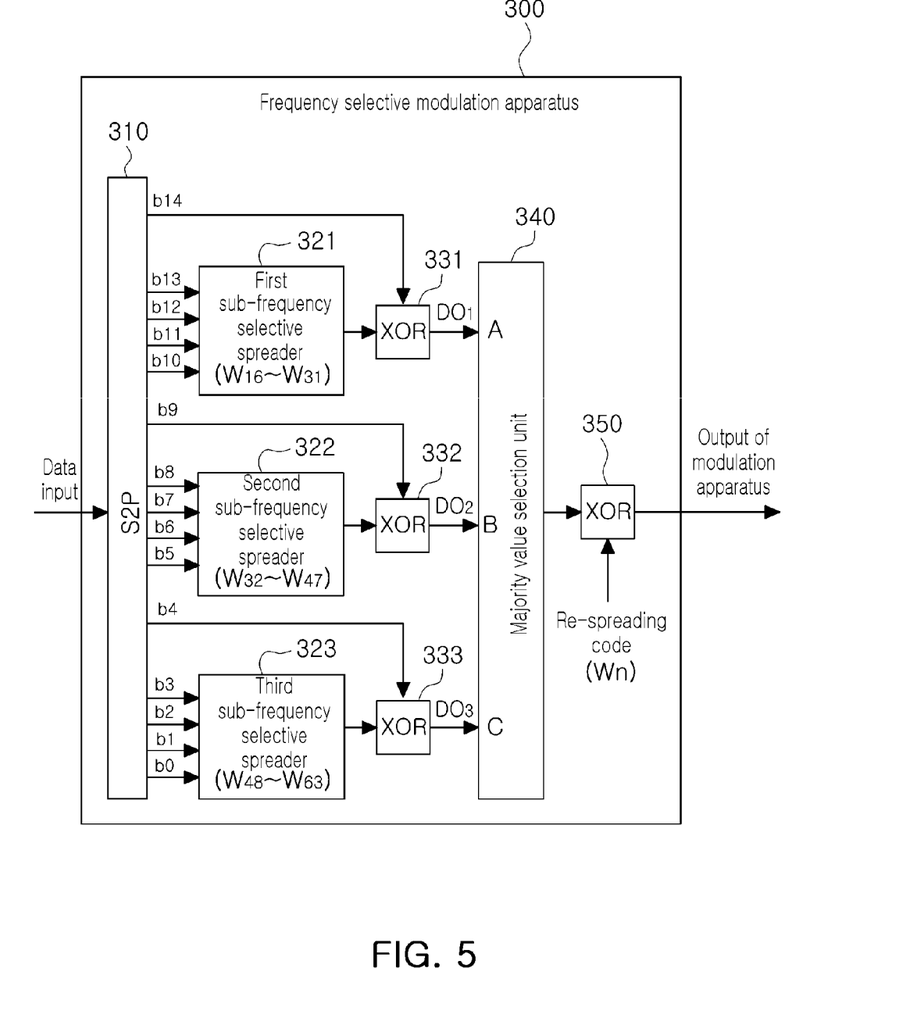
FIG. 5 illustrates the configuration of a frequency selective modulation apparatus according to a third exemplary embodiment of the present invention.

FIG. 5 illustrates the configuration of a frequency selective modulation apparatus according to a third exemplary embodiment of the present invention.

The frequency selective modulation apparatus 300 according to the third exemplary embodiment of the present invention includes a serial-to-parallel converter S2P 310, one or more sub-frequency selective spreaders 321 to 323, a majority value selection unit 330, and one or more XOR logic circuits 331 to 333 and 30. Here, the serial-to-parallel converter S2P 310, the one or more sub-frequency selective spreaders 321 to 323, the majority value selection unit 340, and the XOR logic circuit 350 correspond to the respective elements of the frequency selective modulation apparatus 100 according to the first exemplary embodiment of the present invention. Compared with the frequency selective modulation apparatus 100 according to the first exemplary embodiment of the present invention, the frequency selective modulation apparatus 300 according to the third exemplary embodiment of the present invention additionally includes one or more XOR logic circuits 331 to 333 positioned between the one or more sub-frequency selective spreaders 321 to 323 and the majority value selection unit 340, and XORing 1 bit, among the output from the serial-to-parallel converter S2P 310, and outputs from one or more of the sub-frequency selective spreaders 321 to 323 to increase a transmission data rate.

Unlike the first exemplary embodiment of the present invention, the serial-to-parallel converter S2P 310 converts input serial data into parallel data of P*(M+1) bits and outputs the same. The one or more XOR logic circuits 331 to 333 XOR 1 bit, among the output from the serial-to-parallel converter S2P 310, and the outputs from the one or more sub-frequency selective spreaders 321 to 323, and provides the same to the majority value selection unit 340. The other elements are configured in the same manner as those described above in the first exemplary embodiment of the present invention.

The foregoing process will now be described in detail by using a substantial example.

The serial-to-parallel converter S2P 310 performs a serial-to-parallel conversion on the input serial data at a ratio of 1:15 and outputs 15-bit parallel data of b14, b13, . . . , b0 at a speed of 0.25 Msps.

A first sub-frequency selective spreader 321 receives 4 bits of b13, b12, b11, and b10 among the output from the serial-to-parallel converter S2P 310, selects one of the Walsh codes of the first sub-group $W_{16}$~$W_{31}$ by using the four bits, and outputs it at the speed of 16 Mcps, and the XOR logic circuit 331 XORs an output from the first sub-frequency selective spreader 321 and b14 among the output from the serial-to-parallel converter S2P 310, and outputs $D0_1$ at a speed of 16 Mcps.

A second sub-frequency selective spreader 322 receives 4 bits of b8, b7, b6, and b5 among the output from the serial-to-parallel converter S2P 310, selects one of the Walsh codes of the second sub-group $W_{32}$~$W_{47}$ by using the four bits, and outputs it at the speed of 16 Mcps, and the XOR logic circuit 332 XORs an output from the second sub-frequency selective spreader 322 and b9 among the output from the serial-to-parallel converter S2P 310, and outputs $D0_2$ at a speed of 16 Mcps.

A third sub-frequency selective spreader 323 receives 4 bits of b3, b2, b1, and b0 among the output from the serial-to-parallel converter S2P 310, selects one of the Walsh codes of the third sub-group $W_{48}$~$W_{63}$ by using the four bits, and outputs the same at a speed of 16 Mcps, and the XOR logic circuit 333 XORs an output from the third sub-frequency selective spreader 323 and b4 among the output from the serial-to-parallel converter S2P 310, and outputs $D0_3$ at a speed of 16 Mcps.

The majority value selection unit 340 receives $D0_1$, $D0_2$, and $D0_3$ output from one or more XOR logic circuits 331 to 333, selects a majority value according to Equation 1, and outputs the same.

The XOR logic circuit 350 XORs an output from the majority value selection unit 340 and a re-spreading code W63, one of the 64 Walsh codes generated with an operating frequency $f_B$ 64 MHz, to generate a final output of the frequency selective modulation apparatus 300 having a speed of 64 Mcps.

Figure 6:
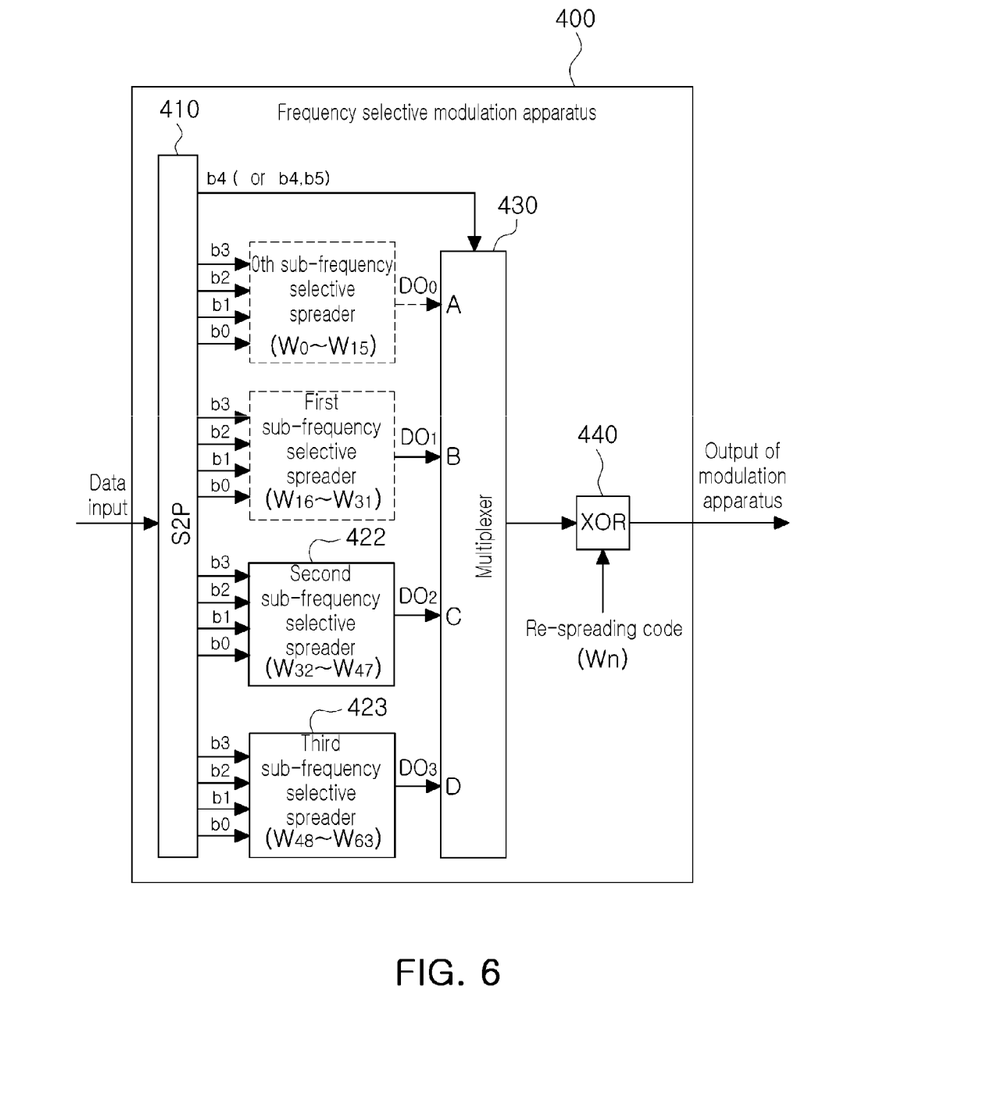
FIG. 6 illustrates the configuration of a frequency selective modulation apparatus according to a fourth exemplary embodiment of the present invention.

FIG. 6 illustrates the configuration of a frequency selective modulation apparatus according to a fourth exemplary embodiment of the present invention.

A frequency selective modulation apparatus 400 according to the fourth exemplary embodiment of the present invention includes a serial-to-parallel converter S2P 410 receiving transmission data and performing a serial-to-parallel conversion on the received transmission data at a pre-set ratio, one or more sub-frequency selective spreaders 422 and 423 selecting one spreading code by using data bits which have been received from the serial-to-parallel converter S2P 410, a multiplexer 430 selecting one spreading code from one or more spreading codes acquired through the one or more sub-frequency selective spreaders 422 and 423 by using the data bits which have been received from the serial-to-parallel converter S2P 410, and an XOR logic circuit 440 XORing an output from the multiplexer 430 and a re-spreading code Wn to re-spread a frequency selective baseband to a frequency selective passband.

The serial-to-parallel converter S2P 410 converts input serial data into parallel data of M+1 or M+2 bits and outputs the same.

Thereafter, the one or more (e.g., P number of) sub-frequency selective spreaders 422 and 423 receive the M number of same data bits, respectively, and select one of $2^M$ number of spreading codes from corresponding sub-groups by using the received M number of data bits. Namely, P number of spreading codes are selected through the P number of sub-frequency selective spreaders 422 and 423.

Thereafter, the multiplexer 430 selects one spreading code from one or more of spreading codes which have been acquired through the P number of sub-frequency selective spreaders 422 and 423 by using 1 or 2 bits which have been received from the serial-to-parallel converter S2P 410.

Thereafter, the XOR logic circuit 440 XORs the output from the multiplexer 430 and the re-spreading code Wn to re-spread the frequency selective baseband to the frequency selective passband. In this case, the re-spreading code Wn is selected from among the spreading codes which have been generated with the operating frequency $f_B$.

The foregoing process will now be described in more detail by using a substantial example.

The serial-to-parallel converter S2P 410 performs a serial-to-parallel conversion on the input serial data at a ratio of 1:5 and outputs 5-bit parallel data of b4, b3, . . . , b0 at a speed of 0.25 Msps.

The second sub-frequency selective spreader 422 receives 4 bits of b3, b2, b1, and b0 among the output from the serial-to-parallel converter S2P 410, selects one of the Walsh codes of the second sub-group $W_{32}$~$W_{47}$ by using the four bits, and outputs $D0_2$ at a speed of 16 Mcps.

The third sub-frequency selective spreader 423 receives 4 bits of b3, b2, b1, and b0 among the output from the serial-to-parallel converter S2P 410, selects one of the Walsh codes of the third sub-group $W_{48}$~$W_{63}$ by using the four bits, and outputs $D0_3$ at a speed of 16 Mcps.

The multiplexer 430 receives b4 among the output from the serial-to-parallel converter S2P 410, and selectively outputs one of $D0_2$ and $D0_3$, the outputs from the second and third sub-frequency selective spreaders 422 and 423, by using the received b4.

The XOR logic circuit 440 XORs an output from the multiplexer 430 and a re-spreading code W63, one of the 64 Walsh codes generated with an operating frequency $f_B$ 64 MHz, to generate a final output of the frequency selective modulation apparatus 400 having a speed of 64 Mcps.

In the fourth exemplary embodiment, the frequency selective modulation apparatus 400 uses the two sub-frequency selective spreaders 422 and 423, but in a different exemplary embodiment, four sub-frequency selective spreaders, namely, the $0^{th}$ to third sub-frequency selective spreaders may be all used. In this case, the serial-to-parallel converter S2P 410 may perform a serial-to-parallel conversion on input serial data at a ratio of 1:6 to output parallel data of six bits of b5, b4, . . . , b0 at a speed of 0.25 Msps. Among the output from the serial-to-parallel converter S2P 410, four bits of b3, b2, b1, and b0 may be input to the $0^{th}$ to third sub-frequency selective spreaders, and $D0_0$ to $D0_3$ may be output therefrom, while b5 and b4 are input to the multiplexer 430 and one of four spreading codes input to the multiplexer 430 may be selectively output. The XOR logic circuit 440 may XOR the output from the multiplexer 430 and the re-spreading code W63, one of the 64 Walsh codes generated with the operating frequency $f_B$ 64 MHz, to generate a final output of the frequency selective modulation apparatus 400 having a speed of 64 Mcps.

Figure 7:
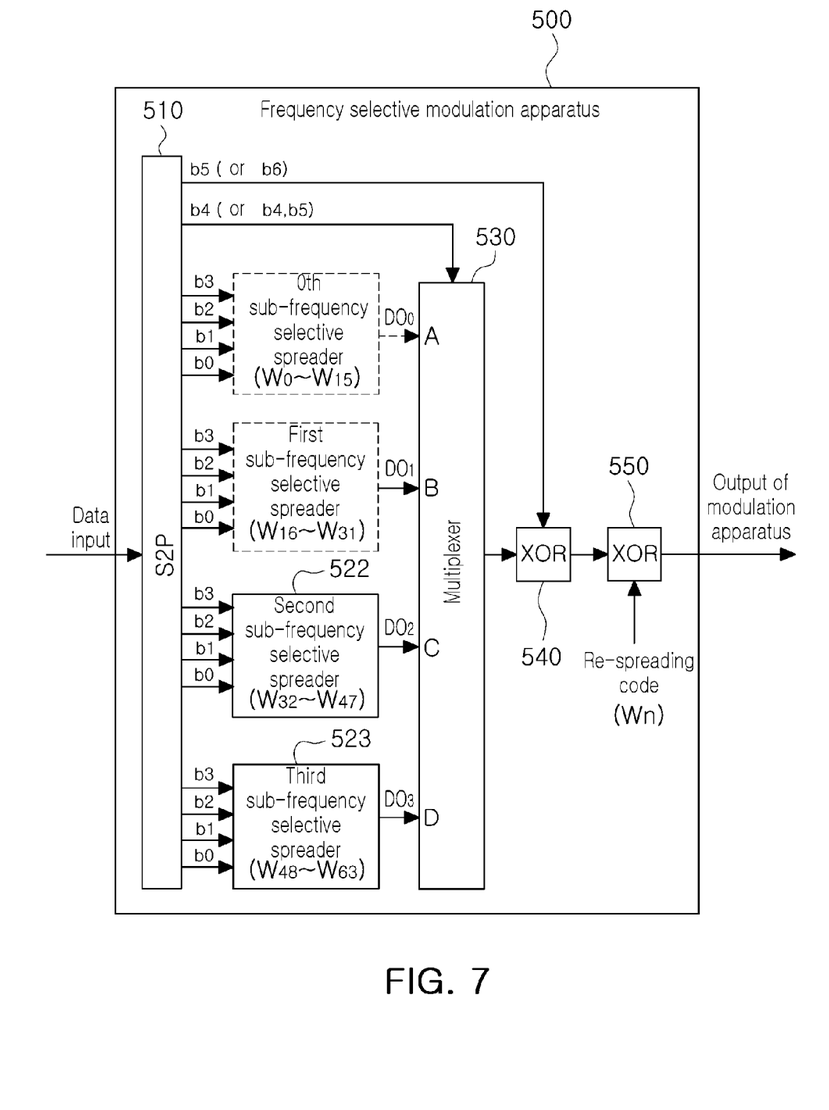
FIG. 7 illustrates the configuration of a frequency selective modulation apparatus according to a fifth exemplary embodiment of the present invention.

FIG. 7 illustrates the configuration of a frequency selective modulation apparatus according to a fifth exemplary embodiment of the present invention.

The frequency selective modulation apparatus 500 according to the fifth exemplary embodiment of the present invention includes a serial-to-parallel converter S2P 510, one or more sub-frequency selective spreaders 522 and 523, a multiplexer 530, and two XOR logic circuits 540 and 550. Here, the serial-to-parallel converter S2P 510, the one or more sub-frequency selective spreaders 522 and 523, the multiplexer 530, and the XOR logic circuit 550 correspond to the respective elements of the frequency selective modulation apparatus 400 according to the fourth exemplary embodiment of the present invention. Compared with the frequency selective modulation apparatus 400 according to the fourth exemplary embodiment of the present invention, the frequency selective modulation apparatus 500 according to the fifth exemplary embodiment of the present invention additionally includes the XOR logic circuit 540 positioned between the multiplexer 530 and the XOR logic circuit 550 for re-spreading, XORing 1 bit, among the output from the serial-to-parallel converter S2P 510, and an output from the multiplexer 530 to increase a transmission data rate.

Unlike the fourth exemplary embodiment of the present invention, the serial-to-parallel converter S2P 510 converts input serial data into parallel data of M+2 or M+3 bits and outputs the same. The XOR logic circuit 540 XORs 1 bit, among the output from the serial-to-parallel converter S2P 510, and the output from the multiplexer 530, and provides the same to the XOR logic circuit 550 for re-spreading. The other elements are configured in the same manner as those described above in the fourth exemplary embodiment of the present invention.

The foregoing process will now be described in detail by using a substantial example.

The serial-to-parallel converter S2P 510 performs a serial-to-parallel conversion on the input serial data at a ratio of 1:6 and outputs 6-bit parallel data of b5, b4, . . . , b0 at a speed of 0.25 Msps.

The second sub-frequency selective spreader 522 receives 4 bits of b3, b2, b1, and b0 among the output from the serial-to-parallel converter S2P 510, selects one of the Walsh codes of the second sub-group $W_{32}$-$W_{47}$ by using the four bits, and outputs $D0_2$ at a speed of 16 Mcps.

The third sub-frequency selective spreader 523 receives 4 bits of b3, b2, b1, and b0 among the output from the serial-to-parallel converter S2P 510, selects one of the Walsh codes of the third sub-group $W_{48}$~$W_{63}$ by using the four bits, and outputs $D0_3$ at a speed of 16 Mcps.

The multiplexer 530 receives b4 among the output from the serial-to-parallel converter S2P 510, and selectively outputs one of $D0_2$ and $D0_3$, the outputs from the second and third sub-frequency selective spreaders 522 and 523, by using the received b4.

The XOR logic circuit 540 XORs b5, 1 bit, among the output from the serial-to-parallel converter S2P 510, and the output from the multiplexer 530 and provides the same to the XOR logic circuit 550 for re-spreading.

The XOR logic circuit 550 XORs the output from the XOR logic circuit 540 and a re-spreading code W63, one of the 64 Walsh codes generated with an operating frequency $f_B$ 64 MHz, to generate a final output of the frequency selective modulation apparatus 500 having a speed of 64 Mcps.

In the fifth exemplary embodiment, the frequency selective modulation apparatus 500 uses the two sub-frequency selective spreaders 522 and 523, but in a different exemplary embodiment, four sub-frequency selective spreaders, namely, $0^{th}$ to third sub-frequency selective spreaders may be all used. In this case, the serial-to-parallel converter S2P 510 may perform a serial-to-parallel conversion on input serial data at a ratio of 1:7 to output parallel data of seven bits of b6, b5, . . . , b0 at a speed of 0.25 Msps. Among the output from the serial-to-parallel converter S2P 510, four bits of b3, b2, b1, and b0 may be input to the $0^{th}$ to third sub-frequency selective spreaders, and $D0_0$ to $D0_3$ may be output therefrom, while b5 and b4 may be input to the multiplexer 530 and one of four spreading codes input to the multiplexer 530 may be selectively output. The XOR logic circuit 540 may XOR b6, 1 bit among the output from the serial-to-parallel convert S2P 510 and the output from the multiplexer 530 and provide the same to the XOR logic circuit 550 for re-spreading, and the XOR logic circuit 550 XORs the output from the XOR logic circuit 540 and the re-spreading code W63, one of the 64 Walsh codes generated with the operating frequency $f_B$ 64 MHz, to generate a final output of the frequency selective modulation apparatus 500 having a speed of 64 Mcps.

Figure 8:
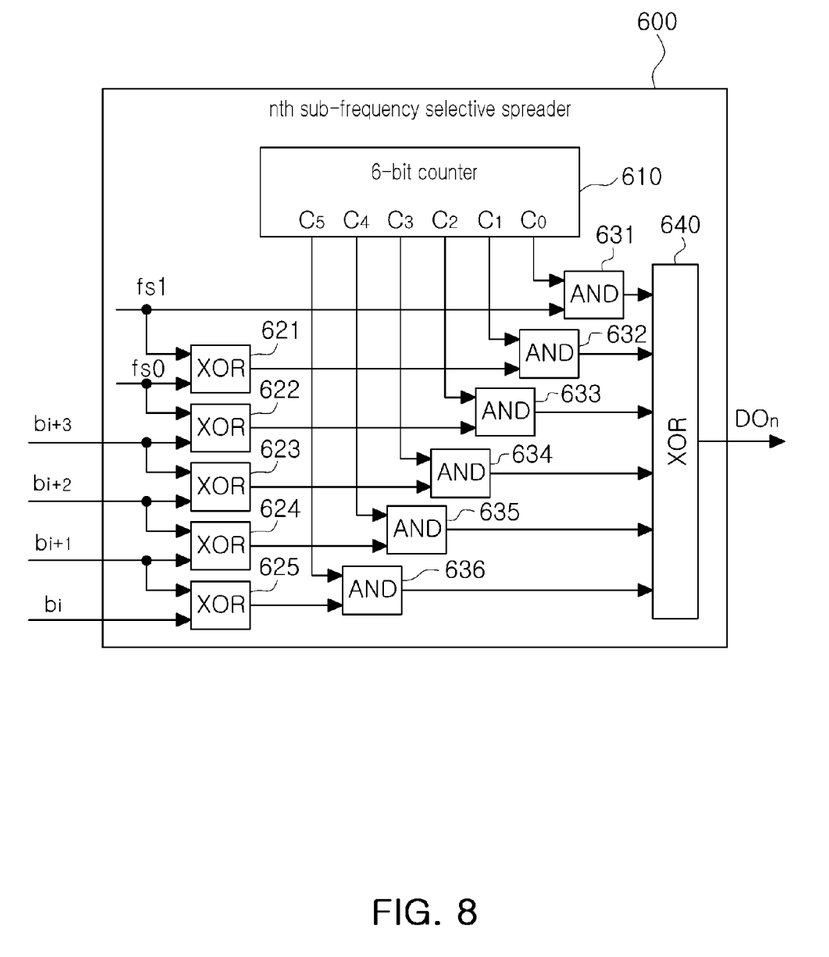
FIG. 8 illustrates the configuration of a sub-frequency selective spreader according to an exemplary embodiment of the present invention.

FIG. 8 illustrates the configuration of a sub-frequency selective spreader according to an exemplary embodiment of the present invention.

A sub-frequency selective spreader n 600 includes a 6-bit counter 610, six XOR logic circuits 621 to 625 and 640, and six AND logic circuits 631 to 636, and has two frequency selective control bits fs1 and fs0 and four data input bits ($b_{i+3}$, $b_{i+2}$, $b_{i+1}$, $b_i$).

The two frequency selective control bits fs1 and fs0 are set to be different by sub-groups. For example, in the case of the first sub-frequency selective spreader $W_{16}$~$W_{31}$, fs1 and fs0 are set to be 0 and 1. In the case of the second sub-frequency selective spreader $W_{32}$~$W_{47}$, fs1 and fs0 are set to be 1 and 0. In the case of the third sub-frequency selective spreader $W_{48}$~$W_{63}$, fs1 and fs0 are set to be 1 and 1.

When the operating frequency $f_A$ of the sub-frequency selective spreader n 600 is 16 MHz, the 6-bit counter 610 is driven at a 16 MHz clock and reset to an initial value 0 at every symbol period in order to count 0 to 63.

The five XOR logic circuits 621 to 625 are used for gray indexing. Six AND logic circuits 631 and 636 receive C5 to C0, i.e., an output from the 6-bit counter 610, fs1, the uppermost significant bit of the frequency selective control bits, and output bits of the five XOR logic circuits 621 to 625. Also, the single XOR logic circuit 640 XORs outputs from the six AND logic circuits 631 to 636.

The sub-frequency selective spreader n 600 generates one of sixteen Walsh codes included in corresponding sub-groups by using the two frequency selective control bits fs1 and fs0 and the four data input bits ($b_{i+3}$, $b_{i+2}$, $b_{i+1}$, $b_i$), and outputs the generated Walsh code in the form of a 1 bit string. A generation formula of an output D0n is represented by Equation 2 shown below:

$$DOn = (fs1 \text{ and } C_0) \text{xor} [(fs1 \text{xor} fs0) \text{ and } C_1] \text{xor} \\ [(fs0 \text{xor} b_{i+3}) \text{ and } C_2] \text{xor} [(b_{i+3} \text{xor} b_{i+2}) \text{ and } C_3] \text{xor} \\ [(b_{i+2} \text{xor} b_{i+1}) \text{ and } C_4] \text{xor} [(b_{i+1} \text{xor} b_i) \text{ and } C_5] \quad \text{[Equation 2]}$$

As set forth above, according to exemplary embodiments of the invention, because the use of an analog transmission/reception stage is minimized, power consumption of an overall system can be reduced. Also, because orthogonal codes having a higher spreading rate can be used owing to a frequency gain obtained through data serial-to-parallel conversion, a processing gain of the overall system can be improved. In addition, the advantages of the frequency selective baseband transmission technique allowing for transmission of a larger amount of data can be all utilized by using a limited number of orthogonal codes based on a frequency selective multi-transmission technique. Furthermore, because a spreading code selection and a free shifting of a transmission frequency band are allowed, a more flexible human body communication system can be accomplished.

While the present invention has been shown and described in connection with the exemplary embodiments, it will be apparent to those skilled in the art that modifications and variations can be made without departing from the spirit and scope of the invention as defined by the appended claims.

What is claimed is:

1. A frequency selective modulation apparatus using re-spreading codes, the apparatus comprising:
   a serial-to-parallel converter configured to receive transmission data and perform serial-to-parallel conversion on the transmission data at a pre-set ratio;
   one or more sub-frequency selective spreaders configured to select one spreading code by using data bits received from the serial-to-parallel converter;
   a majority value selection unit configured to select a majority value from one or more spreading codes which have been selected by each of the one or more of the sub-frequency selective spreaders; and
   a first XOR logic circuit configured to perform an XOR operation on an output of the majority value selection unit and a re-spreading code Wn to re-spread a frequency selective baseband to a frequency selective passband.

2. The apparatus of claim 1, wherein a plurality of sub-groups are generated by dividing $2^N$ (N is a real number) of spreading codes by $2^M$ (M is a real number and M<N), and P number of sub-groups selected from among the plurality of generated sub-groups are used, P being a real number of 1 or larger.

3. The apparatus of claim 1, wherein the re-spreading code Wn is selected from among spreading codes generated with an operating frequency $f_B$ in order to shift the frequency selective baseband to the frequency selective passband by re-spreading the frequency selective baseband using an operating frequency $f_A$.

4. The apparatus of claim 2, wherein the serial-to-parallel converter is configured to convert the transmission data into P*M bits of parallel data and output the P*M bits of parallel data, and P number of sub-frequency selective spreaders are configured to select one spreading code from corresponding sub-groups by using M number of data bits which have been received from the serial-to-parallel converter, respectively.

5. The apparatus of claim 2, further comprising:
   a second XOR logic circuit connected between the majority value selection unit and the first XOR logic circuit and configured to provide a result obtained by performing an XOR operation on 1 bit among an output from the serial-to-parallel converter and an output of the majority value selection unit to the first XOR logic circuit.

6. The apparatus of claim 5, wherein the serial-to-parallel converter is configured to convert the transmission data into parallel data of P*M+1 bits, and P number of sub-frequency selective spreaders are configured to select one spreading code from corresponding sub-groups by using M number of data bits which have been received from the serial-to-parallel converter, respectively.

7. The apparatus of claim 2, further comprising:
   one or more second XOR logic circuits connected between the one or more sub-frequency selective spreaders and the majority value selection unit, and configured to perform an XOR operation on 1 bit of an output of the serial-to-parallel converter and an output of the one or more sub-frequency selective spreaders, and to provide a result of the operation to the majority value selection unit.

8. The apparatus of claim 7, wherein the serial-to-parallel converter is configured to convert the transmission data into parallel data of P*(M+1) bits, and the P number of sub-frequency selective spreaders are configured to select one spreading code from corresponding sub-groups by using the M number of data bits which have been received from the serial-to-parallel converter.

9. A frequency selective modulation apparatus using re-spreading codes, the apparatus comprising:
   a serial-to-parallel converter configured to receive transmission data and perform serial-to-parallel conversion on the transmission data at a pre-set ratio;
   one or more sub-frequency selective spreaders configured to select one spreading code by using data bits received from the serial-to-parallel converter;
   a multiplexer configured to select a spreading code by using the data bits which have been received from the serial-to-parallel converter from one or more spreading codes which have been selected by the one or more of the sub-frequency selective spreaders; and
   a first XOR logic circuit configured to perform an XOR operation on an output of the multiplexer and a re-spreading code Wn to re-spread a frequency selective baseband to a frequency selective passband.

10. The apparatus of claim 9, wherein a plurality of sub-groups are generated by dividing $2^N$ (N is a real number) of spreading codes by $2^M$ (M is a real number and M<N), and P number of sub-groups selected from among the plurality of generated sub-groups are used, P being a real number of 1 or larger.

11. The apparatus of claim 9, wherein the re-spreading code Wn is selected from among spreading codes generated with an operating frequency $f_B$ in order to shift the frequency selective baseband to the frequency selective passband by re-spreading the frequency selective baseband using an operating frequency $f_A$.

12. The apparatus of claim 10, wherein the serial-to-parallel converter is configured to convert the transmission data into M+1 or M+2 bits of parallel data and output the M+1 or M+2 bits of parallel data, P number of sub-frequency selective spreaders are configured to select one spreading code from corresponding sub-groups by using M number of data bits which have been received from the serial-to-parallel converter, respectively, and the multiplexer is configured to select one spreading code by using 1 or 2 bits which have been received from the serial-to-parallel converter.

13. The apparatus of claim 10, further comprising:
   a second XOR logic circuit connected between the multiplexer and the first XOR logic circuit and configured to provide a result obtained by performing an XOR operation on 1 bit among an output from the serial-to-parallel converter and an output of the multiplexer to the first XOR logic circuit.

14. The apparatus of claim 13, wherein the serial-to-parallel converter is configured to convert the transmission data into parallel data of M+2 bits or M+3 bits, and P number of sub-frequency selective spreaders are configured to select one spreading code from corresponding sub-groups by using M number of data bits which have been received from the serial-to-parallel converter, respectively.

15. A frequency selective modulation method using re-spreading codes, the method comprising:

generating a plurality of sub-groups by dividing $2^N$ (N is a real number) number of spreading codes by $2^M$ (M is a real number and M<N);

receiving serial-to-parallel converted data bits, and selecting one spreading code from each of P (P is a real number of 1 or larger) number of sub-groups selected from among the plurality of generated sub-groups, by using the received serial-to-parallel converted data bits;

selecting a majority value from the P number of spreading codes selected from the P number of sub-groups; and XORing the selected majority value and a re-spreading code Wn to re-spread a frequency selective baseband to a frequency selective passband.

16. The method of claim 15, further comprising:

XORing the selected majority value and serial-to-parallel converted 1 bit to generate spreading data including the selected majority value, after selecting the majority value, wherein, in re-spreading the frequency selective baseband to the frequency selective passband, the spreading data and the re-spreading code Wn are XORed.

17. The method of claim 15, further comprising:

XORing the P number of spreading codes which have been selected from the P number of sub-groups and the serial-to-parallel converted 1 bit to generate P number of spreading data including the P number of spreading codes, after selecting the spreading codes, wherein, in selecting the majority value, a majority value is selected from the P number of spreading data.

18. A frequency selective modulation method using re-spreading codes, the method comprising:

generating a plurality of sub-groups by dividing $2^N$ (N is a real number) number of spreading codes by $2^M$ (M is a real number and M<N);

receiving serial-to-parallel converted data bits, and selecting one spreading code from each of P (P is a real number of 1 or larger) number of sub-groups selected from among the plurality of generated sub-groups, by using the received serial-to-parallel converted data bits;

selecting one spreading code from P number of spreading codes which have been selected from the P number of sub-groups by using the serial-parallel converted data bits; and XORing the one spreading code, which have been selected from the P number of spreading codes, and a re-spreading code Wn to re-spread a frequency selective baseband to a frequency selective passband.

19. The method of claim 18, further comprising:

XORing the selected one spreading code and serial-to-parallel converted 1 bit to generate spreading data including the selected one spreading code, after selecting the one spreading code from the P number of spreading codes, wherein, in re-spreading the frequency selective baseband to the frequency selective passband, the spreading data and the re-spreading code Wn are XORed.

\* \* \* \* \*